US011366880B2

(12) United States Patent
Zhou

(10) Patent No.: US 11,366,880 B2
(45) Date of Patent: Jun. 21, 2022

(54) PLAYING MEMORY MANAGEMENT METHOD

(71) Applicant: AMLOGIC (SHANGHAI) CO., LTD., Shanghai (CN)

(72) Inventor: Zhi Zhou, Shanghai (CN)

( * ) Notice: Subject to any disclaimer, the term of this patent is extended or adjusted under 35 U.S.C. 154(b) by 317 days.

(21) Appl. No.: 16/707,474

(22) Filed: Dec. 9, 2019

(65) Prior Publication Data

US 2020/0184039 A1 Jun. 11, 2020

(30) Foreign Application Priority Data

Dec. 10, 2018 (CN) ......................... 201811506534.6

(51) Int. Cl.
*G06F 21/79* (2013.01)
*G06F 21/10* (2013.01)
*G06F 12/02* (2006.01)
*G06F 21/62* (2013.01)

(52) U.S. Cl.
CPC ........ *G06F 21/105* (2013.01); *G06F 12/0223* (2013.01); *G06F 21/6218* (2013.01); *G06F 21/79* (2013.01); *G06F 2221/0746* (2013.01); *G06F 2221/2143* (2013.01)

(58) Field of Classification Search
CPC ......................... G06F 21/79; G06F 2221/2143
See application file for complete search history.

(56) References Cited

U.S. PATENT DOCUMENTS

2013/0305342 A1* 11/2013 Kottilingal .............. G06F 21/62 726/11
2015/0052325 A1* 2/2015 Persson ............... G06F 12/1458 711/163
2018/0267726 A1* 9/2018 Sun ....................... G06F 3/0622

OTHER PUBLICATIONS

Kumar et al. A System For Coarse Grained Memory Protection In Tiny Embedded Processors Jun. 4-8, 2007 2007 44th ACM/IEEE Design Automation Conference (Year: 2007).*
Park et al. GCMA: Guaranteed Contiguous Memory Allocator Mar. 1, 2019 IEEE Transactions on Computers (Year: 2019).*

* cited by examiner

*Primary Examiner* — David J Pearson
(74) *Attorney, Agent, or Firm* — Clement Cheng

(57) ABSTRACT

The invention comprises a playing memory management method, comprising: Step S1, creating a contiguous memory area: Step S2, dividing a contiguous first memory range from the memory area when digital rights management playing information is received; Step S3, setting, by a secure operating system, an access permission for the first memory range; Step S4, performing, by the secure operating system, a decoding operation in the first memory range until the decoding operation is completed; and Step S5, clearing, by the secure operating system, data in the first memory range, releasing the access permission for the first memory range, and releasing the first memory range. The present invention has the beneficial effects that the memory sharing is realized by creating one memory area, setting the access permission during use and clearing data and releasing the access permission after use, so that the manufacturing cost is reduced.

8 Claims, 4 Drawing Sheets

Step S1, creating a contiguous memory area;

Step S2, dividing a contiguous first memory range from the memory area when digital rights management playing information is received;

Step S3, setting, by a secure operating system, an access permission for the first memory range;

Step S4, performing, by the secure operating system, decoding operation in the first memory range until the decoding operation is completed; and Step S5, clearing, by the secure operating system, data in the first memory range, releasing the access permission for the first memory range, and releasing the first memory range.

PLAYING MEMORY MANAGEMENT METHOD

CROSS-REFERENCE TO RELATED APPLICATIONS

The present application claims priority to and the benefit of Chinese Patent Application No. CN 2018/1506534.6 filed on Dec. 10, 2018, the entire content of which is incorporated herein by reference.

BACKGROUND OF THE INVENTION

1. Field of the Invention

The invention relates to the technical field of media encryption, and more particularly, to a playing memory management method.

2. DESCRIPTION OF THE RELATED ART

In the prior art, all memory reserved for video decryption and video decoding is independent memory, and that available to a secure operating system and hardware units thereof is also independent memory. Data security is guaranteed by using a plurality of independent memory, however, it may result in increased free capacity; also, due to the high cost of the memory, the use of the plurality of independent memories may incur a higher production cost.

SUMMARY OF THE INVENTION

Given that the foregoing problems exist in the prior ail, the present invention provides a playing memory management method. According to the method, the memory sharing is realized by creating one memory area, setting the access permission during use and clearing data and releasing the access permission after use, so that the manufacturing cost is reduced.

The detailed technical solution is as follows:

A playing memory management method, comprising:

Step S1, creating a contiguous memory area;

Step S2, dividing a contiguous first memory-range from the memory area when digital rights management playing information is received;

Step S3, setting, by a secure operating system, an access permission for the first memory range;

Step S4, performing, by the secure operating system, a decoding operation in the first memory range until the decoding operation is completed; and Step S5, clearing, by the secure operating system, data in the first memory range, releasing the access permission for the first memory range, and releasing the first memory range.

Preferably, in the above-mentioned playing memory management method, wherein in Step S1, the contiguous memory area is managed by a memory allocator.

Preferably, in the above-mentioned playing memory management method, wherein in Step S2, a master operating system requests, from the memory area, for the memory required for decoding the digital rights management playing information, so as to obtain the first memory range.

Preferably, in the above-mentioned playing memory management method, wherein Step S2 further comprises obtaining all the required memory directly from the memory area to perform the decoding operation when the digital rights management playing information is received, and then exits.

Preferably, in the above-mentioned playing memory management method, wherein Step S3 comprises the steps of:

Step S31, an upper layer control sends a physical address and a capacity of the first memory range to the secure operating system;

Step S32, the secure operating system audits the validity of the first memory range; and Step S33, a memory control module of the secure operating system sets an access permission to the first memory range which gets permitted.

Preferably, in the above-mentioned playing memory management method, wherein in Step S31, the upper layer control sends the physical address and the capacity of the first memory range to a memory controller in the secure operating system through a client application in the master operating system and a trust application in the secure operating system.

Preferably, in the above-mentioned playing memory management method, wherein Step S3 is followed by a step of clearing the data in the first memory range.

Preferably, in the above-mentioned playing memory management method, wherein Step S4 comprises the steps of:

Step S41, the secure operating system starts a video decoder having the access permission;

Step S42, the video decoder requests for a memory pool from the first memory range; and Step S43, the video decoder performs the decoding operation in the memory pool until the decoding operation is completed.

Preferably, in the above-mentioned playing memory management method, wherein Step S5 comprises the steps of:

Step S51, exiting from the video decoder, and saving data from the memory pool to the first memory range;

Step S52, clearing the data in the first memory range by using the upper layer control; and Step S53, releasing the access permission for the first memory range by using the upper layer control.

By adopting the above-mentioned technical solutions, the present invention has the beneficial effects that the memory sharing is realized by creating one memory area, setting the access permission during use and clearing data and releasing the access permission after use, so that the manufacturing cost is reduced.

BRIEF DESCRIPTION OF THE DRAWINGS

The accompanying drawings, together with the specification illustrate exemplary embodiments of the present disclosure, and, together with the description, serve to explain the principles of the present invention.

DETAILED DESCRIPTION

Figure 1:
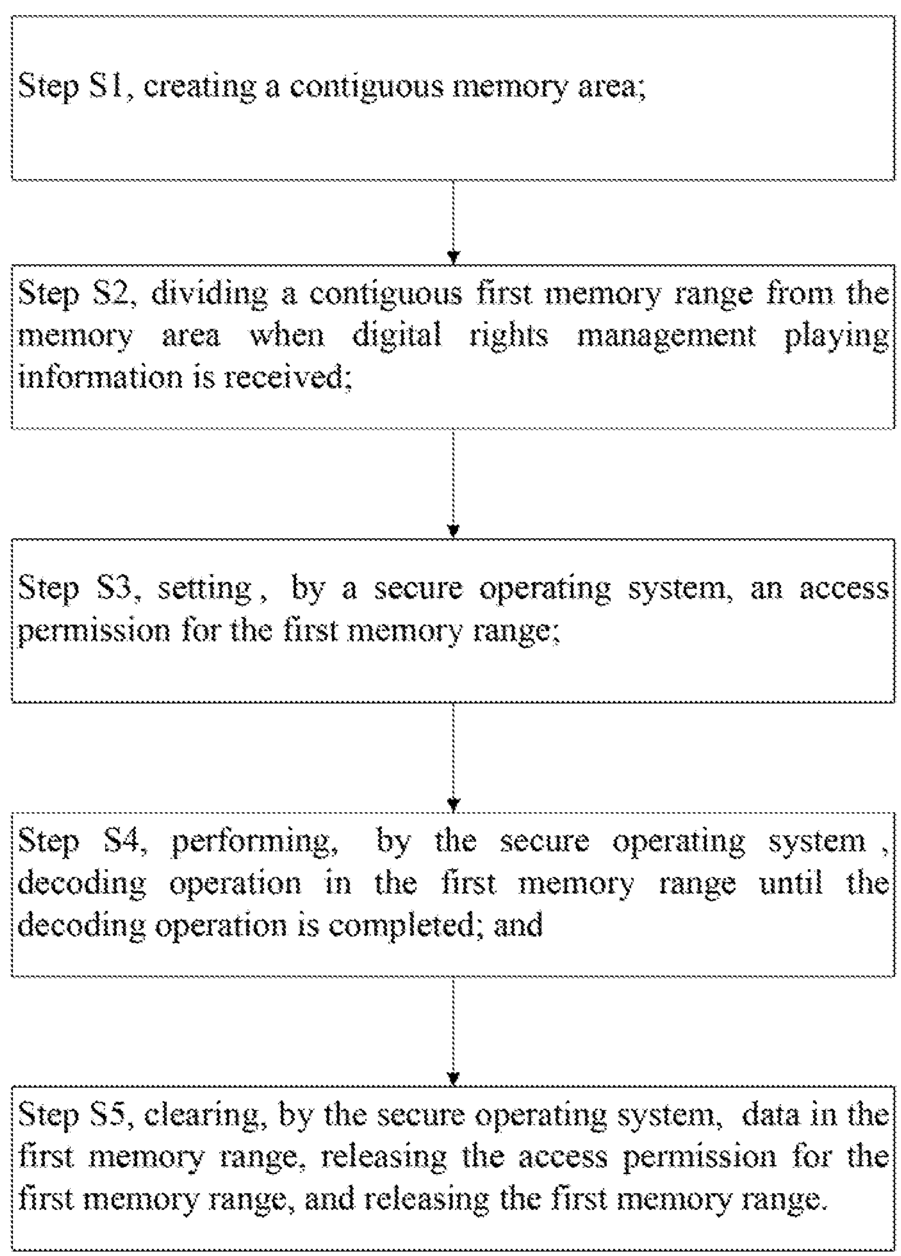
FIG. 1 is a flowchart illustrating a playing memory management method according to an embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning, th t the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

The invention comprises a playing memory management method. As shown in FIG. 1, the method comprises:

Step S1, creating a contiguous memory area;

Step S2, dividing, a contiguous first memory range from the memory area when digital rights management playing information is received;

Step S3, setting, by a secure operating system, an access permission for the first memory range;

Step S4, performing, by the secure operating system, a decoding operation in the first memory range until the decoding operation is completed; and Step S5, clearing, by the secure operating system, data in the first memory range, releasing the access permission for the first memory range, and releasing the first memory range.

Furthermore, in the above-mentioned embodiment, the first memory range, is a dynamic high-security memory area.

Furthermore, as a preferred embodiment, a contiguous memory area is created; a contiguous first memory range is divided from the memory area when digital rights management playing information is received; an access permission is set for the first memory range; after use, data in the first memory range is cleared, and the access permission for the first memory range is released for implementing a shared memory. As a result, the manufacturing cost is reduced, security level similar to that of a plurality of independent memory is achieved, and the memory is released to the normal operating system in free time.

Wherein, an objective of setting the access permission for the first memory range through the secure operating system is to prevent data in the first memory range from unauthorized access, such that the data in the first memory range is protected.

It should be noted that a smooth playing of a 4K DRM video is achievable in the case of a small memory size.

Furthermore, as a preferred embodiment, a total of 200M memory is needed for the playing of the 4K DRM video. However, it should be noted that the 200M memory may be allocated to other applications (such as, games) when it is not used to play the 4K DRM video, that is, other applications and the 4K DRM video can run smoothly and simultaneously on a platform with a small memory size.

Furthermore, in the above-mentioned embodiment, in Step S1, the contiguous memory area is managed by a contiguous memory allocator (CMA).

Wherein, the memory area may be mar aged by a memory allocator in which the memory area may be used for normal decoding. The normal decoding refers to non-digital rights management playing and digital rights management playing.

It should be noted that the CMA memory is an independent CMA memory.

Furthermore, as a preferred embodiment, all the hardware modules, such as High Definition Multimedia Interface (HDMI), Graphics Processing Unit (GPU), Cameras, encoders, and decoders, need a large block of contiguous memory, and each of the hardware modules is configured with independent memory. When those hardware modules are out of work, the independent memories for each of the hardware modules are in idle, leading to a waste of the memory. Therefore, in order to avoid the waste of memory, a CMA management mechanism is implemented on a Linux system, that is, when the independent memory is not directly occupied by the above-mentioned hardware modules, it is mapped to the upper layer control by using a Memory Management Unit (MMU). When the contiguous memory is needed by a bottom drive, simply request for a free memory, and CMA data is copied into the free area and the free memory is remapped by using MMU. In this way, a shared memory is obtained, and the manufacturing cost is reduced.

Furthermore, in the above-mentioned embodiment, wherein in Step S2, a master operating system requests, from the memory area, for the memory required for decoding the digital rights management playing information, so as to obtain the first memory range.

Wherein, the master operating system is the Linux system. A physical address and a capacity of the first memory range are know, and are managed by a Block (Block is a block code in computer language) memory management mechanism of the Linux system.

The CMA management mechanism is implemented in the Linux system, that is, the memory may be shared conveniently via the Linux system, and the manufacturing cost is reduced.

Furthermore, in the above-mentioned embodiment, wherein Step S2 further comprises obtaining all the required memory directly from the memory area to perform the decoding operation when the digital rights management playing information is received, and then exits.

Figure 2:
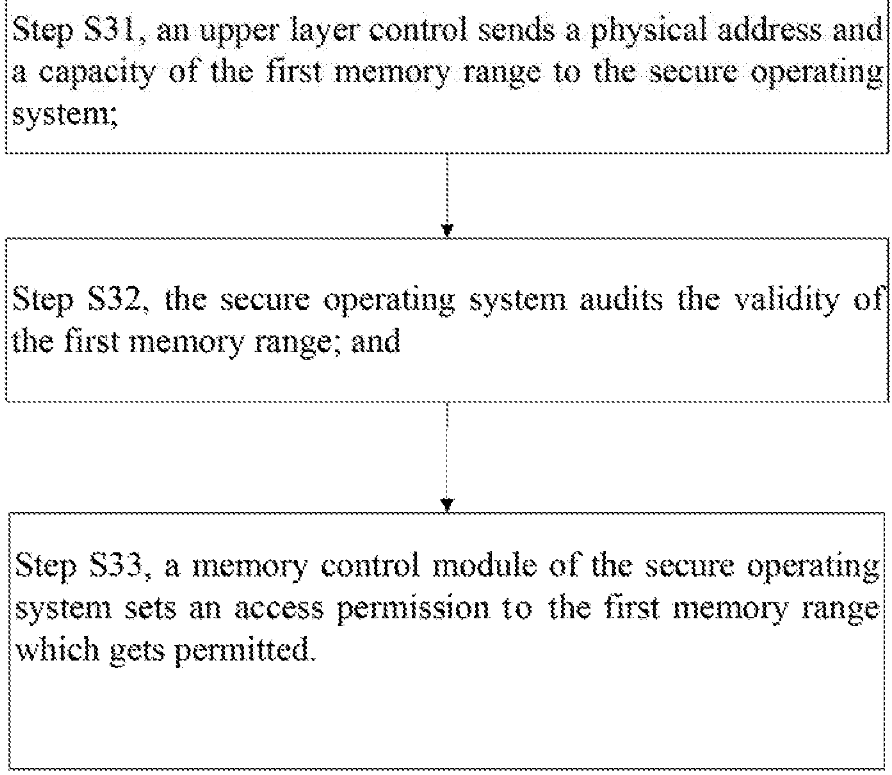
FIG. 2 is a flowchart illustrating Step S3 of the playing memory management method according to an embodiment of the present invention.

Furthermore, in the above-mentioned embodiment, as shown in FIG. 2, Step S3 comprises the steps of;

Step S31, an upper layer control sends the physical address and the capacity of the first memory range to the secure operating system;

Step S32, the secure operating system audits the validity of the first memory range; and Step S33, a memory control module of the secure operating system sets an access permission to the first memory range which gets permitted.

Furthermore, in the above-mentioned embodiment, wherein in Step S31, the upper layer control sends the physical address and the capacity of the first memory range to a memory controller in the secure operating system through a client application in the master operating system and a trust application in the secure operating system.

It should be noted that sending the physical address and the capacity of the first memory range to a memory controller of the secure operating system through the client application and the trust application plays a role in protecting the physical address and the capacity of the first memory range, thus, the data security is improved.

Furthermore, as a preferred embodiment, first of all, the upper layer control sends the physical address and the capacity of the first memory range to the secure operating system; then the secure operating system audits the validity of the first memory range, and the physical address is set an access permission through the memory controller for the first memory range which gets permitted. The access permission may be set such that only the CPU in the secure operating system and hardware relevant to the decoding operation are allowed to access the first memory range. In addition, modifications may be made to the access permission. However, the modifications have to be made in the secure operating system.

It should be noted that the secure operating system and the Central Processing Unit of the Advanced RISC Machine (ARM) have a TrustZone mechanism. Also, the Linux system and the secure operating system may be implemented in the same ARM CPU, but the Linux system has no access to the data in the secure operating system. The data in the secure operating system is protected by the hardware and is not accessible to the outside world, such that key information is not stolen and the data security is improved.

It should be noted that ARM TrustZone technology is a system-wide security method for a large number of applications on a high performance computing platform. The applications may comprise secure payment, DRM, enterprise service and applications for web-based service. The TrustZone mechanism presented in above CPU may protect the applications, and may protect hardware devices, such as secure memory, encryption blocks, keyboards, and screens from being attacked by software.

Furthermore, in the above-mentioned embodiment, Step S3 is followed by a step of clearing the data in the first memory range.

Figure 3:
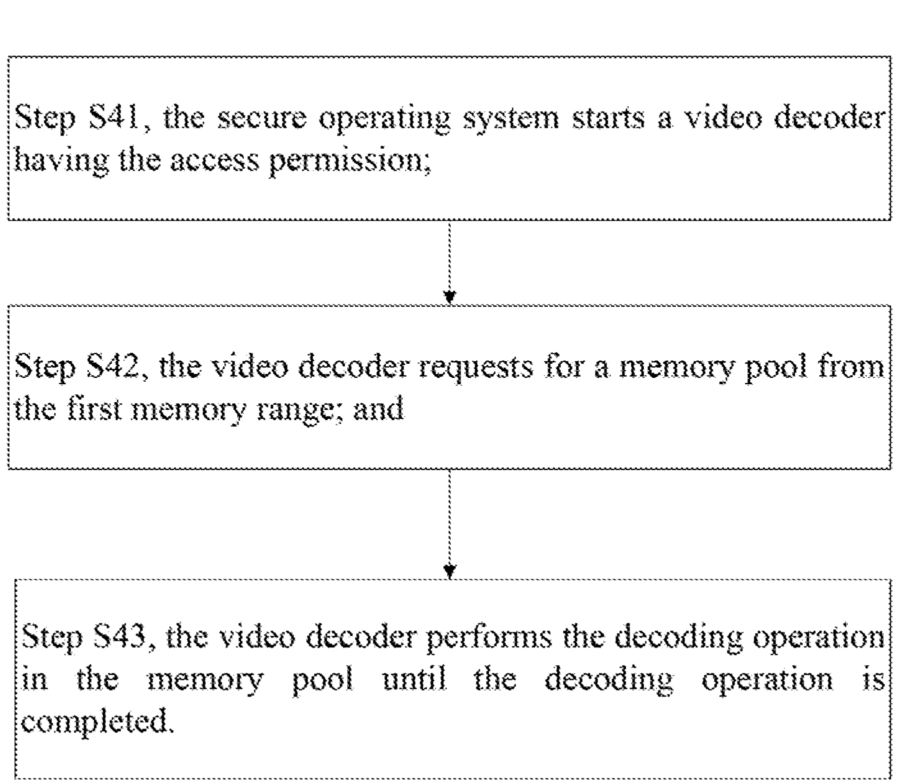
FIG. 3 is a flowchart illustrating Step S4 of the playing memory management method according to an embodiment of the present invention.

Furthermore, in the above-mentioned embodiment, as shown in FIG. 3, Step S4 comprises the steps of:

Step S41, the secure operating system starts a video decoder having the access permission;

Step S42, the video decoder requests for a memory pool from the first memory range; and Step S43, the video decoder performs the decoding operation in the memory pool until the decoding operation is completed.

Furthermore, in the above-mentioned embodiment, wherein Step S41 comprises starting the video decoder, and setting a DRM identity for the video decoder;

wherein the DRM identity is used to determine the access permission.

Furthermore, as a preferred embodiment, since the DRM identity for the video decoder has the access permission to the first memory, it can be decoded and output normally. In addition, the first memory is protected by the memory controller, therefore, data before subjected to decoding operation and the output data may not be intercepted by the external CPU or the external hardware. As a result, data is protected and data security is improved.

Figure 4:
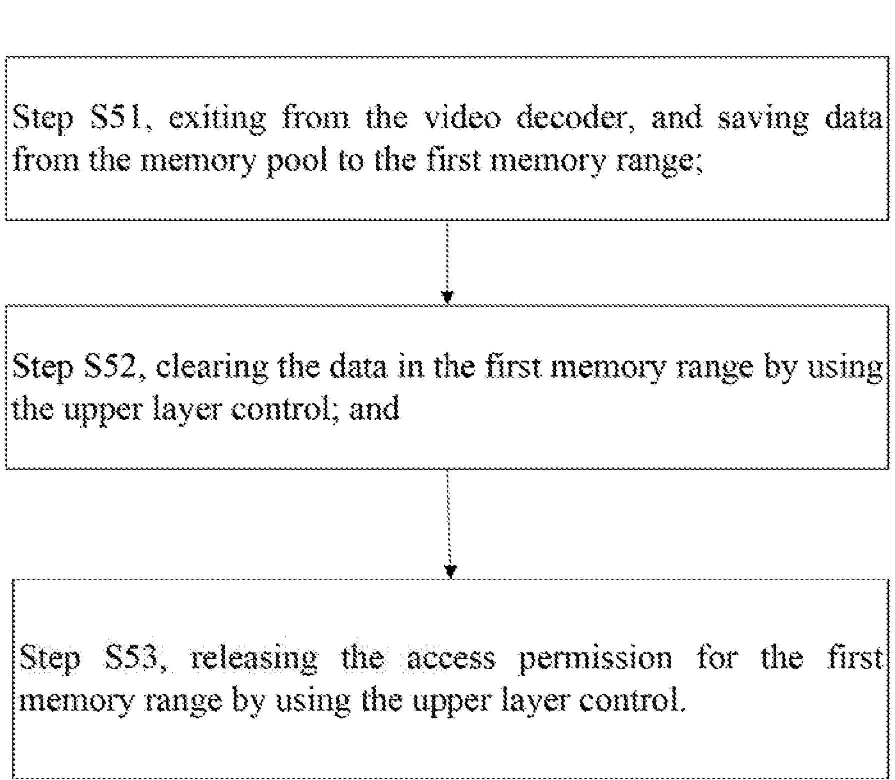
FIG. 4 is a flowchart illustrating Step S5 of the playing memory management method according to an embodiment of the present invention.

Furthermore, in the above-mentioned embodiment, as shown in FIG. 4, Step S5 comprises the steps of:

Step S51, exiting from the video decoder, and saving data from the memory pool to the first memory range; when exiting from the video decoder, releasing a second memory, and saving the data of the memory occupied by the video decoder to the first memory;

Step S52, clearing the data in the first memory range by using the upper layer control; and Step S53, releasing the access permission for the first memory range by using the upper layer control.

Furthermore, as a preferred embodiment, the upper layer control is an Application Programming Interface (API), through which, the switch of the first memory and the second memory is implemented. Wherein, the step of the switch process is, clearing the data in the first memory by using the upper layer control, and releasing the access permission for the first memory, that is, protection for the first memory is released.

Wherein, the API for the switch process may be invoked outside the secure operating system.

The above descriptions are only the preferred embodiments of the invention, not thus limiting; the embodiments and scope of the invention. Those skilled in in the art should be able to realize that the schemes obtained from the content of specification and drawings of the invention are within the scope of the invention.

What is claimed is:

1. A playing memory management method, comprising:

Step S1, creating a contiguous memory area;

Step S2, dividing a contiguous first memory range from the memory area when digital rights management playing information is received;

Step S3, setting, by a secure operating system, an access permission for the first memory range;

Step S4, performing, by the secure operating system, a decoding operation in the first memory range until the decoding operation is completed; and Step S5, clearing, by the secure operating system, data in the first memory range, releasing the access permission for the first memory range, and releasing the first memory range;

wherein in Step S1, the contiguous memory area is managed by a Contiguous Memory Allocator, when independent memory is not directly occupied by its hardware module, the independent memory is mapped to upper layer control by using a Memory Management Unit, the upper layer control is Application Programming Interface;

the access permission is only CPU in the secure operating system and hardware relevant to decoding operation are allowed to access the first memory range.

2. The playing memory management method of claim 1, wherein, in Step S2, a master operating system requests, from the memory area, for the memory required for decoding the digital rights management playing information, so as to obtain the first memory range, the master operating system is Linux system.

3. The playing memory management method of claim 1, wherein Step S2 further comprises obtaining all the required memory directly from the memory area to perform the decoding operation when the digital rights management playing information is received, and then exits.

4. The playing memory management method of claim 1, wherein Step S3 comprises the steps of:

Step S31, an upper layer control sends a physical address and a capacity of the first memory range to the secure operating system;

Step S32, the secure operating system audits the validity of the first memory range; and Step S33, a memory control module of the secure operating system sets an access permission to the first memory range which gets permitted.

5. The playing memory management method of claim 4, wherein in Step S31, the upper layer control sends the physical address and the capacity of the first memory range to a memory controller in the secure operating system through a client application in the master operating system and a trust application in the secure operating system.

6. The playing memory management method of claim 1, wherein Step S3 is followed by a step of clearing the data in the first memory range.

7. The playing memory management method of claim 1, wherein Step S4 comprises the steps of:

Step S41, the secure operating system starts a video decoder having the access permission;

Step S42, the video decoder requests for a memory pool from the first memory range; and Step S43, the video decoder performs the decoding operation in the memory pool until the decoding operation is completed;

wherein Step S41 comprises starting the video decoder, and setting a DRM identity for the video decoder;

wherein the DRM identity is used to determine the access permission.

8. The playing memory management method of claim 7, wherein Step S5 comprises the steps of:

Step S51, exiting from the video decoder, and saving data from the memory pool to the first memory range;

Step S52, clearing the data in the first memory range by using the upper layer control; and Step S53, releasing the access permission for the first memory range by using the upper layer control.

* * * * *